United States Patent Office 3,808,243
Patented Apr. 30, 1974

3,808,243
N-FORMYL-α-NITRO-ALKANE CARBOXYLIC ACID AMIDES AND PROCESS FOR THE PRODUCTION THEREOF
Verena R. Foitl, Basel, and Walter Traber, Riehen, Switzerland, assignors to Ciba-Geigy Corporation, Ardsley, N.Y.
No Drawing. Continuation-in-part of abandoned application Ser. No. 49,553, June 24, 1970. This application Nov. 24, 1971, Ser. No. 201,953
Int. Cl. C07c *103/30*
U.S. Cl. 260—404.5     12 Claims

ABSTRACT OF THE DISCLOSURE

This invention describes new N-formyl-α-nitroalkane carboxylic acid amides of the formula

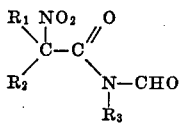

wherein $R_1$ represents an alkyl radical having 1 to 12 carbon atoms,
$R_2$ represents hydrogen or a lower alkyl radical, and
$R_3$ represents a lower alkyl radical, and a process for their production. These N-formyl-α-nitroalkane carboxylic acid amides are important intermediates in the production of α-amino acids.

CROSS-REFERENCE TO RELATED APPLICATION

This is a continuation-in-part of application Ser. No. 49,553, filed June 24, 1970 now abandoned.

DETAILED DISCLOSURE

The invention concerns new N-formyl-α-nitroalkane carboxylic acid amides and a process for the production thereof.

From the literature it is known to react activated aromatic compounds with a formylating agent based on an N-disubstituted formamide and a halogenating agent for the production of aldehydes (Vilsmeir-Haak reaction).

According to the present invention, N-formyl-α-nitroalkane carboxylic acid amides of the Formula I

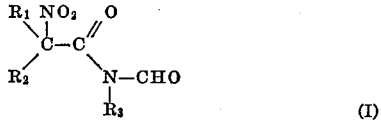

wherein $R_1$ represents an alkyl radical having 1 to 12 carbon atoms,
$R_2$ represents hydrogen or a lower alkyl radical, and
$R_3$ represents a lower alkyl radical, are produced by reacting an alkane carboxylic acid amide of the formula II

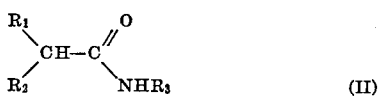

with the formamide of a secondary amine and a halogenating agent, nitrating the resulting complex intermediate product at a temperature between −10 and +30° C. and then hydrolyzing it at a temperature below +30° C.

By "lower alkyl" is meant saturated aliphatic hydrocarbon radicals having from 1 to 5 carbon atoms.

For the process according to the invention, the starting materials N-alkyl-carboxylic acid amide, formamide and halogenating agent are preferably employed in a molar ratio of 1:1:2. The formamide can, however, also be employed in a multiple of the molar amount, the excess serving as solvent and/or diluent. In general, an aprotic solvent or diluent is necessary in the reaction forming the complex compound. Besides formamide, aliphatic halogenated hydrocarbons such as dichloromethane, chloroform, chloronated ethanes, aromatic hydrocarbons and halogenated hydrocarbons, as well as ether and ether-type compounds, etc. may be employed as aprotic solvents and diluents. Aprotic solvents are those which do not give off protons under the given reaction conditions.

Suitable as carboxylic acid amides of Formula II are the N-lower alkyl amides of the following alkane carboxylic acids: ethane carboxylic acid (propionic acid), propane carboxylic acids (butyricacid, isobutyric acid), butane carboxylic acid (valeric acid, isovaleric acid, butane-2-carboxylic acid), pentane carboxylic acids (caproic acid, isocaproic acid, etc.), hexane carboxylic acid, etc.), heptane carboxylic acids (caprylic acid, etc.), octane carboxylic acids (pelargonic acid, etc.), nonane carboxylic acids (capric acid, etc.), decane carboxylic acids, undecane carboxylic acids (e.g. lauric aid), dodeane carboxylic acids, tridecane carboxylic acids (myristic acid).

The formamides of secondary amines employed correspond to the Formula III

In this formula:

$R'$ represents an alkyl radical having 1 to 5 carbon atoms,
$R''$ represents an alkyl radical having 1 to 5 carbon atoms, a phenyl, benzyl or cycloalkyl radical, or
$R'$ and $R''$ together with the adjacent nitrogen atom represent a heterocyclic ring which can contain further hetero atoms.

Preferably the following formamides of Formula III are employed: N,N - dimethylformamide, N,N - diethylformamide, N-methylformanilide, N-formylmorpholine, in particular, however, N,N-dimethylformamide.

Suitable as halogenating agents are, in particular, the halides of the following inorganic oxyacids: phosphorus oxychloride, phosphorus trichloride, phosphorus pentachloride, phosphorus tribromide, phosphorus oxybromide, thionyl chloride, sulfuryl chloride, phosgene, oxalyl chloride or benzoyl bromide.

For the nitration, preferably nitrating acid, i.e. a mixture of concentrated or fuming nitric acid and concentrated sulfuric acid, is used. In order to attain as quantitative a nitration as possible, it is advantageous to use in nitrating acid in excess; preferably the double to fivefold molar amount of $HNO_3$ is used, calculated on the amount of alkane carboxylic acid amide used. When a nitrating acid consisting of concentrated nitric acid, concentrated sulfuric acid and sulfur trioxide is used, the molar ratio of nitric acid to alkane carboxylic acid amide can be 1:1.

When performing the process according to the invention, it has proved expedient to start with the formamide, adding the halogenating agent at temperatures between 0° and 40° C., preferably between 0° and 10° C., while stirring thoroughly. When the formamide is used in equimolar amounts, calculated on the carboxylic acid amide, it is necessary to perform the reaction in the presence of an organic aprotic solvent or diluent. Then the alkane carboxylic acid amide is added. Both of the last-mentioned reaction components, the halogenating agent and the alkane carboxylic acid amide, can be employed in the reaction dissolved in one of the aprotic solvents mentioned above such as benzene, chloroform, etc. To increase the velocity of the reaction, which in itself proceeds smoothly at temperatures in the range of 0 to 40° C., the reaction mixture can be heated to temperatures of not more than 120° C., preferably to 60 to 85° C. After completion of the reaction, it is expedient to remove the solvent at 0 to 40° C. in vacuum and to add the complex intermediate product obtained directly to the nitrating acid. Also for this step in the nitration, it is essential that the temperature be kept below 30° C., preferably at 10° C. The nitrating mixture is finally hydrolyzed with ice water, the temperature not being more than 30° C., preferably not more than 15° C.

The new N-formyl-α-nitro-alkane carboxylic acid amides are obtained according to the invention in very good yields. They are important intermediates from which, by reduction of the nitro group and subsequent hydrolysis α-amino acids are produced.

The following examples illustrate the invention. The temperatures are given in degrees centigrade and the boiling points are uncorrected.

EXAMPLE 1

11.9 ml. of dimethylformamide in 250 ml. of chloroform are treated dropwise at 0 to 5° with 26.3 ml. of phosphorus oxychloride. The mixture is then stirred for one hour at 5°, then treated with a solution of 13.6 g. of isobutyric acid-methyl amide ($n_D^{20}$: 1.4405, B.P. 56–60°/0.005 torr) in 120 ml. of chloroform, stirred for one hour at room temperature and then refluxed for 10 hours. The reaction mixture is then cooled and concentrated in vacuum. A nitrating mixture obtained from 22 ml. of concentrated nitric acid and 120 ml. of concentrated sulfuric acid is then added dropwise to the residue at 0 to 10° with stirring. The mixture is then poured onto ice and extracted several times with chloroform. After drying and removal of the chloroform by distillation, the residue is fractionated in vacuum. The α-nitro-isobutyric acid-N-formyl-N-methyl-amide has a boiling point of 75–85°/0.001 torr. Refraction index $n_D^{20}=1.4780$.

EXAMPLE 2

12 ml. of dimethylformamide and 100 ml. of chloroform are treated dropwise at 20° with 26.3 ml. of phosphorus oxychloride and stirred for 30 minutes at the same temperature. The mixture is then treated dropwise at 20° with a solution of 15.2 g. of isovaleric acid-N-methyl-amide (B.P. 74–76°/0.01 torr, refraction index $n_D^{20}=1.4444$), stirred for one hour at 20° and subsequently refluxed for 10 hours. The mixture is then concentrated in vacuum. The residue is treated dropwise at 0 to 10° with a nitrating mixture obtained from 22 ml. of concentrated nitric acid and 120 ml. of concentrated sulfuric acid, then poured onto ice and extracted with chloroform. After cooling and removal of the solvent by distillation, the residue is fractionated in vacuum. The α-nitro-isovaleric acid-N-formyl-N-methylamide has a boiling point of 80–90°/0.001 torr, refraction index $n_D^{20}=1.4764$.

In the manner described in the preceding examples, using the appropriate carboxylic acid amides of Formula II, dimethylformamide and phosphorus oxychloride, there are obtained the compounds listed in the following table:

Compound: Physical data
 α - Nitro - lauric acid - N-formyl-N-methylamide  B.P. 145–150°/0.05 torr.
 α-Nitro-lauric acid-N-formyl-n-butylamide.

What we claim is:
1. N-formyl-α-nitro-alkane carboxylic acid amide compounds of the formula

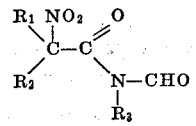

wherein
$R_1$ represents alkyl having from 1 to 12 carbon atoms,
$R_2$ represents hydrogen, and
$R_3$ represents lower alkyl.

2. A compound according to claim 1 which is α-nitro-isobutyric acid N-formyl-N-methylamide.
3. A compound according to claim 1 which is α-nitro-isovaleric acid N-formyl-N-methylamide.
4. A compound according to claim 1 which is α-nitro-lauric acid α-formyl-N-methylamide.
5. A compound according to claim 1 which is α-nitro-lauric acid N-formyl-N-n-butylamide.
6. A process for the production of N-formyl-α-nitro-alkane carboxylic acid amide compounds of claim 1 comprising adding an alkane carboxylic acid amide of the formula

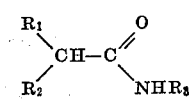

to a mixture of a formamide of a secondary amine and a halogenating agent, nitrating the complex intermediate product obtained and subsequently hydrolyzing it, said nitration and hydrolysis being conducted at a temperature below about 30° C.

7. A process according to claim 6, in which the formamide of a secondary amine is dimethylformamide and the halogenating agent is an inorganic oxyacid.
8. A process according to claim 6, in which phosphorus trichloride, phosphorus tribromide, phosphorus oxychloride, phosphorus pentachloride, phosgene or thionyl chloride is employed as a halogenating agent.
9. A process according to claim 6, in which the nitration is performed with a mixture consisting of nitric acid and sulfuric acid.
10. A process according to claim 6 in which the intermediate product is nitrated at temperatures between $-10$ and $+30°$ C.
11. A process according to claim 6, in which the hydrolysis is performed at temperatures below $+30°$ C.
12. A process according to claim 6, in which the reaction is performed in the presence of organic aprotic solvents and/or diluents.

References Cited
UNITED STATES PATENTS 2,090,596  8/1937  Jacobson  260—561 R
2,574,505  11/1951  Sletzinger et al.  260—561 R
2,998,437  8/1961  Benton  260—404

LEWIS GOTTS, Primary Examiner

E. G. LOVE, Assistant Examiner

U.S. Cl. X.R.
260—561 R